May 8, 1951   S. C. SPIELMAN   2,551,771
ELECTRICAL PULSE GENERATOR
Filed Aug. 30, 1944

INVENTOR.
Sterling C. Spielman
BY
Howson & Howson
attys.

Patented May 8, 1951

2,551,771

UNITED STATES PATENT OFFICE 2,551,771

ELECTRICAL PULSE GENERATOR

Sterling C. Spielman, Huntingdon Valley, Pa., assignor, by mesne assignments, to Philco Corporation, Philadelphia, Pa., a corporation of Pennsylvania Application August 30, 1944, Serial No. 551,952

3 Claims. (Cl. 250—27)

The present invention relates to pulse generators and more particularly to pulse generators which will provide accurately timed multiple pulses of a predetermined quantity.

Frequently for control and testing purposes it is desired to provide apparatus whereby there may be obtained periodic pulses which are accurately timed as to their occurrence and number. Previously circuits were used having blocking oscillators keyed by multivibrators. Such arrangements have the disadvantage that the multivibrators were unstable in the timing of the multiple pulses provided thereby. In accordance with the present invention an asymmetrical multivibrator is started by an initial pulse, and that output of the multivibrator is utilized to control the generation of oscillatory energy for a predetermined time interval. The oscillations generated are then translated into rectangular pulses and by differentiation the rectangular pulses may be translated into periodic pulses accurately timed. By suitable adjustment the frequency and Q of the oscillator circuit may be so selected as to provide for the generation of a predetermined number of pulses each time that the cycle of operation is initiated.

It is, therefore, an object of the present invention to provide an improved circuit arrangement for the generation of pulses accurately fixed in time and quantity.

It is still another object of the present invention to provide an arrangement for the generation of pulses of alternating current of a desired frequency which may be translated into a certain number of accurately timed pulses.

Figure 1:
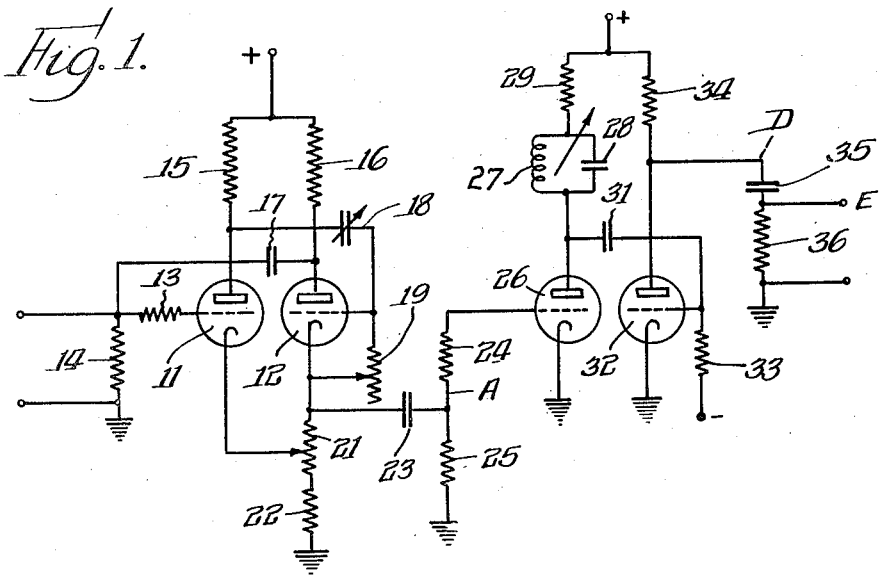
Figure 2:
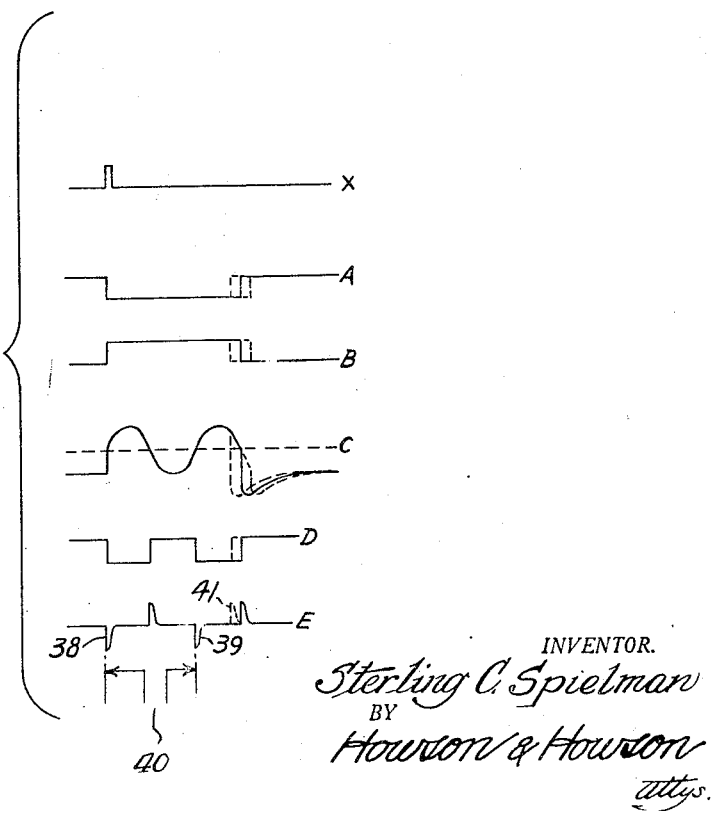

Other and further objects of the present invention subsequently will become apparent by reference to the following description taken in connection with the accompanying drawing wherein Figure 1 is a circuit arrangement embodying the present invention; and Figure 2 is a graphical representation illustrating the operation of the invention.

In Figure 1 of the drawing there is shown an asymmetrical multivibrator arranged for external synchronization in utilizing a pair of vacuum tubes 11 and 12 which may if desired be combined in the single envelope as is the case with the vacuum tube of the type 6SN7. The grid circuit of the vacuum tube 11 includes resistors 13 and 14 connected between the grid and ground, and the resistor 14 constitutes an input circuit which is arranged to receive a synchronizing pulse or a pulse to initiate the operation of the asymmetrical multivibrator. The anodes of the vacuum tubes 11 and 12 are provided with anode resistors 15 and 16 connected to a suitable source of anode potential. The anode of the vacuum tube 12 is coupled by a capacitor 17 to the common juncture between the resistors 13 and 14 of the grid circuit of the vacuum tube 11. The anode of the vacuum tube 11 is coupled through a variable or adjustable capacitor 18 to the grid of the vacuum tube 12. The grid of the vacuum tube 12 is connected to a resistor 19 provided with an adjustable contact which is connected to the cathode of the vacuum tube. The cathode of the vacuum tube 12 is connected through resistors 21 and 22 to ground. The resistor 21 is provided with an adjustable contact which is connected to the cathode of the vacuum tube 11. The cathode of the vacuum tube 12 is connected to a coupling capacitor 23 which in turn is connected to a voltage divider circuit including resistors 24 and 25 connected between ground and the grid of the vacuum tube 26. The cathode of the vacuum tube is connected to ground and the anode is connected through an oscillatory circuit comprising an inductor 27 and a parallel capacitor 28, which in turn is connected through an anode resistor 29 to a suitable source of anode potential. The anode of the vacuum tube 26 is coupled by a capacitor 31 to the grid of a succeeding vacuum tube 32 which is provided with a grid resistor 33 connected to a suitable source of negative potential. The cathode of the vacuum tube 32 is connected to ground and the anode is connected to an anode coupling resistor 34 to the source of anode potential. The anode of the vacuum tube 32 is coupled by a capacitor 35 to an output resistor 36 which is connected to ground. While the vacuum tubes 26 and 32 have been shown as being arranged in two envelopes, a single envelope tube such as the 6SN7 or the 6SL7 may be used.

The operation of the arrangement shown in Figure 1 will become apparent by reference to the graphical representation in Figure 2 wherein the curve X illustrates the triggering impulse supplied across the input resistor 14 to initiate operation of the asymmetrical multivibrator. The application of the impulse shown by the curve X causes the multivibrator to generate an impulse corresponding to the curve A of Figure 2. This voltage, therefore, appears in the grid circuit of the vacuum tube 26 and the magnitude of the potential thus provided is sufficient to bias the tube 26 to anode current cut-off.

Prior to the application of the impulse A to the grid of the vacuum tube 26 anode current was flowing through the tube so that the flow of the anode current stored a certain amount of enregy in the oscillatory circuit comprising an inductor 27 and the capacitor 28. Upon interruption of the anode flow through the vacuum tube 26 the energy stored in the oscillatory circuit will be converted into high frequency oscillations determined by the resonant frequency to which the circuit has been adjusted. The duration of the oscillatory energy occurring in the circuit comprising the inductor 27 and the capacitor 28 is determined by the Q of the circuit and for purposes of explanation it may be assumed that during the pulse interval A shown in Figure 2 the circuit will generate one and one-half cycles as illustrated by the curve C. The oscillatory energy generated by this circuit is impressed by the coupling capacitor 31 upon the grid of the vacuum tube 32 which by virtue of the high negative voltage applied through the grid resistor 33 squares off the voltage C so as to form the voltage curve D at the output of the vacuum tube 32. Each time the voltage C crosses the cut-off voltage level of tube 32 (which is represented by the horizontal broken line) a square wave output pulse is either initiated or ended, depending on whether the voltage C is increasing or decreasing at the time. By means of the capacitor 35 differentiation is obtained to provide a curve such as shown at E which represents the voltage appearing across the output resistor 36. In the representation of the curve E the negative pulses 38 and 39 are the pulses which are to be utilized and which are accurately timed by an interval 40. In accordance with the assumption previously made as to the number of cycles of oscillatory energy supplied by the oscillatory circuit the pulse A permits only one and one-half cycles whereupon the voltage appearing at the grid of the vacuum tube 26 drops to its former value and thus again permitting anode current to flow. The initiation of anode current flow through the vacuum tube 26 places in shunt with the energy storage circuit comprising the inductor 27 and the capacitor 28 an effective damping resistance approximately equal to the reciprocal of the mutual conductance of the vacuum tube 26 at zero bias. This effective resistance has a damping action which is effective to stop oscillations very rapidly. Upon supplying subsequent negative voltage impulses to the grid circuit of the vacuum tube 26, the energy storage circuit operates to supply another pulse of oscillating energy.

It will now be shown that even though the multivibrator pulse represented by the curve A of Figure 2 is not accurate in time duration, that this has no effect upon the number of or the timing of the pulses such as 38 and 39 which are presented across the output circuit comprising the resistor 36. The dotted line representation to the left of the end of the pulse A indicates the occurrence when the pulse supplied by the multivibrator is somewhat shorter than is desired. This produces a change in the anode voltage supplied to the vacuum tube 26 as indicated by the dotted line representation in curve B and similarly a corresponding effect is indicated by the dotted line representation at the left of the end of curve C thus showing that the oscillations supplied by the energy storage circuit are interrupted at an earlier time. This would shorten the later pulse indicated at curve D and would produce an earlier positive pulse 41 shown in curve E. The positive pulse 41 is not utilized and this pulse does not affect the timing of the pulses 38 and 39 which are separated by the time interval 40.

If on the other hand the multivibrator pulse A is somewhat too long as indicated by the dotted line representation to the right of the end of the pulse A, the operation will be as indicated by dotted lines to the right of the ends of the curves B and C. The belated occurrence of the end of pulse A, while causing belated occurrence of the end of the oscillation C, does not cause any change in the occurrence of the final square wave edge of square wave D, due to the fact that the edges of the square wave are produced only when the oscillation C crosses the broken line axis which corresponds to the cut-off voltage level of tube 32.

If the oscillatory circuit comprising an inductor 27 and a capacitor 28 is adjusted to a different frequency and if the Q of the circuit is sufficiently high, a greater number of half cycles of alternating current will be generated during a time interval and hence the curve C would have more half cycles represented therein. An additional cycle would produce an additional negative pulse. For example in a certain circuit arrangement having a Q of 50, three pulses were obtained. A higher Q has the advantage of providing a greater timing accuracy since the attenuation constant as determined by the value of high frequency resistance of the oscillation circuit will be less when provided oscillations having a greater amplitude. The steepness of the curve at the point where the alternating curve changes from negative to positive affects the accuracy of the formation of the negative pulses such as 38 and 39. It is significant to note that whenever the anode current of the vacuum tube 26 is interrupted that the generation of the high frequency current always begins in each instance with a half cycle of alternating current in the same direction so that the pulse 38 always occurs upon initiation of oscillations, and subsequent pulses corresponding to pulse 39 occur in accordance with the resonant frequency of the circuit.

From the foregoing description, it will be seen that certain relations are inherent in the system and its operation. For convenience, the number of desired pulses may be designated $n$ and the time space interval of such pulses may be designated T. It will be apparent that the resonant frequency of the resonant circuit 27, 28 is equal to the reciprocal of the interval T. Moreover, if the duration of the pulse A be designated $\Delta T$, it will be apparent that $\Delta T$ is always such that $nT > \Delta T > (n-1)T$.

In order to further illustrate the present invention in the manner in which it may be constructed, certain representative circuit values will be given for the apparatus shown in Figure 1. The vacuum tubes 11 and 12 of the asymmetrical multivibrator may be combined in a single envelope tube such as a 6SN7. Similarly the vacuum tubes 26 and 32 may be combined in single envelope tubes such as a 6SN7 or 6SL7. With the selection of such tubes the input circuit resistor 14 may have a value of 100,000 ohms, and the grid circuit resistor 13 a value of 12,000 ohms. The capacitor 17 interconnecting the anode of the vacuum tube 12 with the grid circuit of the vacuum tube 11 has a value of .01 microfarad and the other capacitor 18 has a value similar thereto. The adjustable resistor 19 of the grid circuit of the vacuum tube 12 may be formed in two portions so that the fixed resistor portion adjacent the grid has a value of 33,000 ohms and the adjustable portion a value of 20,000 ohms. The cathode resistors 21 and 22 are of 2,000 and 1,000 ohms respectively. The multivibrator is coupled to the succeeding tube through a capacitor of .01 microfarad.

The grid resistors 24 and 25 of the vacuum tube 26 have values of 22,000 and 27,000 ohms respectively. The anode resistors 29 and 34 of the vacuum tubes 26 and 32 have values of 2,200 and 10,000 ohms respectively. The grid circuit of the vacuum tube 32 includes a resistor of 100,000 ohms connected to a negative potential source of approximately twenty-seven volts. The grid circuit is connected by a capacitor of .01 microfarad to the anode of the preceding tube. The capacitor 35 has a value of fifty micromicrofarads and the resistor 36 across the output terminals has a value of 10,000 ohms. The resistor 29 which has a value of 2,200 ohms operates to place the alternating current wave of curve C of Figure 2 above the reference line so that the negative waves are of no effect. The bias supplied to the resistor 33 of the vacuum tube 32 is important so that undesirable critical cut-off is avoided. It will be recalled that the vacuum tube 32 is biased to a certain number of volts beyond cut-off so as to square off the voltage of the curve C to obtain the voltage curve D of Figure 2.

While for the purpose of illustrating and explaining the present invention a certain circuit arrangement has been shown in the drawing, it is to be understood that such other embodiments or modifications are contemplated as properly come within the scope of the appended claims.

This invention is hereby claimed as follows:

1. Apparatus for generating a predetermined number of accurately time-spaced pulses of desired polarity, said apparatus comprising: a vacuum tube, an oscillatory energy storage circuit connected in the anode-to-cathode circuit thereof, a grid circuit for said tube including a biasing voltage of sufficient magnitude normally to maintain flow of anode current in said tube, thereby storing oscillatory energy in said storage circuit and loading said storage circuit with the low conduction impedance of said tube to prevent oscillations therein, means for applying a temporary negative bias potential to said grid circuit to effect anode current cut-off for an interval corresponding to the temporary application of said negative bias, said storage circuit being responsive to said anode current cut-off to produce, continuously throughout said interval, oscillations of a frequency determined by the resonant frequency of said storage circuit, means for deriving square waves from said oscillations, said last means being responsive to each crossing by said oscillations of a given voltage reference level in one predetermined direction to produce a positive-going square wave step, and said last means being further responsive to each crossing by said oscillations of said voltage reference level in the opposite direction to produce a negative-going square wave step, and pulse-forming means responsive to square wave voltage steps in the same sense as the step most nearly coincident with the end of said interval to produce undesired pulses of predetermined polarity, and responsive to steps in the opposite sense to produce desired pulses of opposite polarity.

2. Apparatus for generating a predetermined number of accurately time-spaced pulses of desired polarity in response to a trigger input pulse, said apparatus comprising: an asymmetrical multivibrator to whose input said trigger pulse is applied; a first vacuum tube whose control grid circuit includes the output of said multivibrator; a parallel resonant circuit connected in the anode-to-cathode circuit of said vacuum tube; a second vacuum tube whose control grid circuit includes said resonant circuit; and a differentiating network connected in the anode-to-cathode circuit of said second tube, said multivibrator being arranged to supply, prior to application of a trigger pulse, an output potential which maintains flow of anode current in said first tube, thereby storing oscillatory energy in said resonant circuit and precluding oscillations therein, said multivibrator being responsive to application of said trigger pulse to produce a negative output pulse whose duration is approximately the same for each repeated application of a trigger pulse and whose amplitude is sufficient to produce anode current cut-off in said first tube for said duration, said resonant circuit being responsive to such anode current cut-off to initiate and maintain for said duration oscillations of a frequency determined by the resonant frequency of said resonant circuit, said second tube being responsive to said oscillations in its grid circuit to conduct with predetermined intensity whenever said oscillations exceed the tube cut-off potential and to become non-conductive whenever said oscillations do not exceed said cut-off potential, thereby producing square waves in its anode-to-cathode circuit whose edges correspond to intersections of the potential of said oscillations and said cut-off potential, and said differentiating network being responsive to positive-going square wave edges to produce pulses of one polarity and to negative-going square wave edges to produce pulses of opposite polarity.

3. Apparatus responsive to a trigger pulse for generating a predetermined number $n$ of pulses accurately time-spaced by intervals $T$ and of desired polarity, said apparatus comprising: an asymmetrical multivibrator to whose input said trigger pulse is applied; a first vacuum tube having at least anode, cathode and control grid electrodes and whose control grid circuit includes the output of said multivibrator; a parallel resonant circuit connected in the anode-to-cathode circuit of said first vacuum tube, said resonant circuit having a resonant frequency equal to the reciprocal of said interval $T$; a second vacuum tube also having at least anode, cathode and control grid electrodes and whose control grid circuit includes said resonant circuit; and a differentiating network connected in the anode-to-cathode circuit of said second tube, said multivibrator being arranged to supply, prior to the application of a trigger pulse, an output potential which maintains said first tube conductive, thereby storing oscillatory energy in said resonant circuit and preventing oscillations in said circuit by virtue of the relatively low conduction impedance of said first tube shunting said resonant circuit, said multivibrator being responsive to application of said trigger pulse to produce a negative output pulse of duration $\Delta T$ such that $nT > \Delta T > (n-1)T$ and of amplitude suffifficient to render said first tube non-conductive for said duration, said resonant circuit being responsive to non-conduction of said first tube to initiate and maintain oscillations of said resonant frequency for said duration, said second tube being responsive to said oscillations in its grid circuit to conduct with predetermined intensity whenever the potential of said oscillations exceeds the tube cut-off potential and to cease conducting whenever said oscillation potential does not exceed said cut-off potential, thereby producing square-waves in its anode-to-cathode circuit whose voltage steps correspond to transitions of said oscillation potential through said cut-off potential, said differentiating network being responsive to square-wave voltage steps of the same polarity as the step most nearly coincident with the end of said duration to produce pulses of undesired polarity and responsive to square-wave voltage steps of opposite polarity to produce pulses of opposite and desired polarity.

STERLING C. SPIELMAN.

REFERENCES CITED

The following references are of record in the file of this patent:

UNITED STATES PATENTS

| Number | Name | Date |
|---|---|---|
| 2,085,402 | Vance | June 29, 1937 |
| 2,166,688 | Kell | July 18, 1939 |
| 2,181,309 | Andrieu | Nov. 28, 1939 |
| 2,193,850 | Andrieu | Mar. 19, 1940 |
| 2,230,926 | Bingley | Feb. 4, 1941 |
| 2,266,668 | Tubbs | Dec. 16, 1941 |
| 2,277,000 | Bingley | Mar. 17, 1942 |
| 2,365,512 | Bartelink | Dec. 19, 1944 |
| 2,399,135 | Miller et al. | Apr. 23, 1946 |
| 2,423,304 | Fitch | July 1, 1947 |
| 2,425,600 | Coykendall | Aug. 6, 1947 |
| 2,426,216 | Hight | Aug. 26, 1947 |
| 2,434,920 | Grieg | Jan. 27, 1948 |
| 2,438,904 | DeRosa | Apr. 6, 1948 |

FOREIGN PATENTS

| Number | Country | Date |
|---|---|---|
| 400,976 | Great Britain | Nov. 6, 1933 |
| 44,218 | Netherlands | Sept. 17, 1938 |